United States Patent
McCloud et al.

(10) Patent No.: US 7,808,937 B2
(45) Date of Patent: *Oct. 5, 2010

(54) VARIABLE INTERFERENCE CANCELLATION TECHNOLOGY FOR CDMA SYSTEMS

(75) Inventors: Michael L McCloud, Boulder, CO (US); Vijay Nagarajan, Boulder, CO (US)

(73) Assignee: Rambus, Inc., Los Altos, CA (US)

( * ) Notice: Subject to any disclaimer, the term of this patent is extended or adjusted under 35 U.S.C. 154(b) by 1272 days.

This patent is subject to a terminal disclaimer.

(21) Appl. No.: 11/272,411

(22) Filed: Nov. 10, 2005

(65) Prior Publication Data

US 2006/0227730 A1 Oct. 12, 2006

Related U.S. Application Data

(63) Continuation-in-part of application No. 11/100,935, filed on Apr. 7, 2005, now abandoned, and a continuation-in-part of application No. 11/233,636, filed on Sep. 23, 2005.

(51) Int. Cl.
*H04B 3/20* (2006.01)

(52) U.S. Cl. .............. 370/286; 370/335; 375/148; 375/285; 375/316; 375/340; 375/349

(58) Field of Classification Search ........... 370/286, 370/335; 375/147, 148, 346, 349, 285, 316, 375/340; 455/296
See application file for complete search history.

(56) References Cited

U.S. PATENT DOCUMENTS

| | | | |
|---|---|---|---|
| 6,175,587 B1 * | 1/2001 | Madhow et al. ........... 375/148 |
| 6,574,270 B1 * | 6/2003 | Madkour et al. ........... 375/148 |
| 6,711,219 B2 * | 3/2004 | Thomas et al. ........... 375/346 |
| 6,798,850 B1 * | 9/2004 | Wedin et al. .............. 375/340 |
| 7,200,183 B2 * | 4/2007 | Olson et al. ............... 375/285 |
| 7,245,679 B2 * | 7/2007 | Aoki et al. ................ 375/349 |
| 7,292,623 B2 * | 11/2007 | Reznik ...................... 375/148 |
| 7,373,128 B2 * | 5/2008 | Dowling .................... 455/296 |
| 7,394,879 B2 * | 7/2008 | Narayan et al. ........... 375/346 |
| 7,430,253 B2 * | 9/2008 | Olson et al. ............... 375/316 |
| 7,440,490 B2 * | 10/2008 | Kidiyarova-Shevchenko et al. .......................... 375/148 |
| 7,440,492 B2 * | 10/2008 | Maruyama ................. 375/148 |
| 7,463,609 B2 * | 12/2008 | Scharf et al. .............. 370/335 |
| 7,477,710 B2 * | 1/2009 | Narayan et al. ........... 375/349 |
| 7,577,186 B2 * | 8/2009 | Thomas et al. ........... 375/148 |
| 2003/0202568 A1 * | 10/2003 | Choi et al. ................. 375/148 |
| 2004/0017867 A1 * | 1/2004 | Thomas et al. ........... 375/346 |
| 2004/0022302 A1 * | 2/2004 | Olson et al. ............... 375/148 |
| 2005/0031060 A1 * | 2/2005 | Thomas et al. ........... 375/346 |
| 2006/0072654 A1 | 4/2006 | Nielsen |
| 2006/0153283 A1 * | 7/2006 | Scharf et al. .............. 375/148 |
| 2006/0227730 A1 * | 10/2006 | McCloud et al. .......... 370/286 |
| 2006/0227854 A1 * | 10/2006 | McCloud et al. .......... 375/148 |

* cited by examiner

*Primary Examiner*—Gerald Gauthier
(74) *Attorney, Agent, or Firm*—Barcelo & Harrison, LLP

(57) ABSTRACT

An interference canceller comprises a composite interference vector (CIV) generator configured to produce a CIV by combining soft and/or hard estimates of interference, an interference-cancelling operator configured for generating a soft-projection operator, and a soft-projection canceller configured for performing a soft projection of the received baseband signal to output an interference-cancelled signal. Weights used in the soft-projection operator are selected to maximize a post-processing SINR.

32 Claims, 2 Drawing Sheets

VARIABLE INTERFERENCE CANCELLATION TECHNOLOGY FOR CDMA SYSTEMS

CROSS-REFERENCE TO RELATED APPLICATIONS

This application is a continuation-in-part of commonly owned and U.S. patent application Ser. No. 11/100,935, filed Apr. 7, 2005 now abandoned, entitled "Construction of Projection Operators for Interference Cancellation," and U.S. patent application Ser. No. 11/233,636, filed Sep. 23, 2005, entitled "Optimal Feedback Weighting for Soft-Decision Cancellers."

BACKGROUND

1. Field of the Invention

The present invention relates generally to interference cancellation in received wireless communication signals and, more particularly, to forming and using a composite interference signal for interference cancellation.

2. Discussion of the Related Art

In an exemplary wireless multiple-access system, a communication resource is divided into subchannels and allocated to different users. For example, subchannels may include time slots, frequency slots, multiple-access codes, spatio-temporal subchannels, or any combination thereof. A plurality of sub-channel signals received by a wireless terminal (e.g., a subscriber unit or a base station) may correspond to different users and/or different subchannels allocated to a particular user.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into subchannels in order to differentiate between users.

In a multipath environment, received signals are superpositions of time delayed (and complex scaled) versions of the transmitted signals. Multipath can cause co-channel and cross-channel interference that correlates the allocated subchannels. For example, co-channel interference may occur when time-delayed reflections of transmitted signals from the same source interfere with each other. Cross-channel interference occurs when signals in a subchannel leak into and, thus, impair acquisition and tracking of other subchannels.

Co-channel and cross-channel interference can degrade communications by causing a receiver to incorrectly decode received transmissions, thus increasing a receiver's error floor. Interference may also have other degrading effects on communications. For example, uncancelled interference may diminish capacity of a communication system, decrease the region of coverage, and/or decrease maximum data rates. Previous interference-cancellation techniques include subtractive and projective interference cancellation, such as disclosed in U.S. Pat. Nos. 6,856,945 and 6,947,474, which are hereby incorporated by reference.

SUMMARY OF THE INVENTION

In view of the foregoing background, embodiments of the present invention may be employed in receivers configured to implement receive diversity and equalization. Embodiments may provide for optimally forming and using at least one composite interference vector (CIV) for use in any subtractive or projective interference canceller. Such embodiments may be employed in any receiver employing a Rake, such as (but not limited to) receivers configured to receive ultra-wideband (UWB), Code Division Multiple Access (CDMA), Multiple-Input/Multiple-Output (MIMO), and narrowband single-carrier signals. Embodiments of the invention may provide for analytically characterizing the signal-to-interference-and-noise ratio (SINR) in a composite signal or in a user subchannel, and choosing feedback terms (e.g., adaptive weights) to construct an interference-cancelled signal that maximizes this quantity.

Embodiments of the invention employ soft weighting of a projective operation to improve interference cancellation. For example, each finger of a Rake receiver is matched to a particular time delay and/or base station spreading code to combat the effects of frequency-selective fading and interference from multiple base stations, respectively. Inter-finger interference occurs due to loss of orthogonality in the user waveforms resulting from multipaths in the transmission channel. This interference may be mitigated by feeding soft estimates of active users' waveforms between the Rake fingers in order to improve the SINR at the output of each finger. The optimization is performed per Rake finger prior to combining. In a receiver employing receive diversity, fingers that are common to two or more receive paths may be combined using any of various well-known statistical signal-processing techniques.

In one embodiment of the invention, a means for generating one or more CIVs, a means for generating a soft-projection operator, and a means for performing a soft projection are configured to produce an interference-cancelled signal from a received baseband signal. The means for generating the one or more CIVs may include, by way of example, any means for deriving soft and/or hard estimates from a receiver and synthesizing the one or more CIVs therefrom. For example, the means for generating the one or more CIVs may include a symbol estimator (e.g., a symbol estimator in a receiver employing any combination of Rake processing, receive diversity, and equalization), a subchannel selector, a fast Walsh transform, and a PN coder. The means for generating the one or more CIVs may further include a channel emulator. The means for generating a soft-projection operator may include, by way of example, a soft-projection matrix generator or an interference-cancelling operator that includes a means for selecting a soft weight that maximizes a post-processing SINR. The means for performing a soft projection may include, by way of example, a signal processor configured to project a received baseband signal as specified by the soft-projection operator in order to produce an interference-cancelled signal.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

These and other embodiments of the invention are described with respect to the figures and the following description of the preferred embodiments.

BRIEF DESCRIPTION OF THE DRAWINGS

Embodiments according to the present invention are understood with reference to the flow diagram of FIG. 1 and the schematic block diagrams of FIGS. 2A and 2B.

DESCRIPTION OF THE PREFERRED EMBODIMENTS

Figure 1:
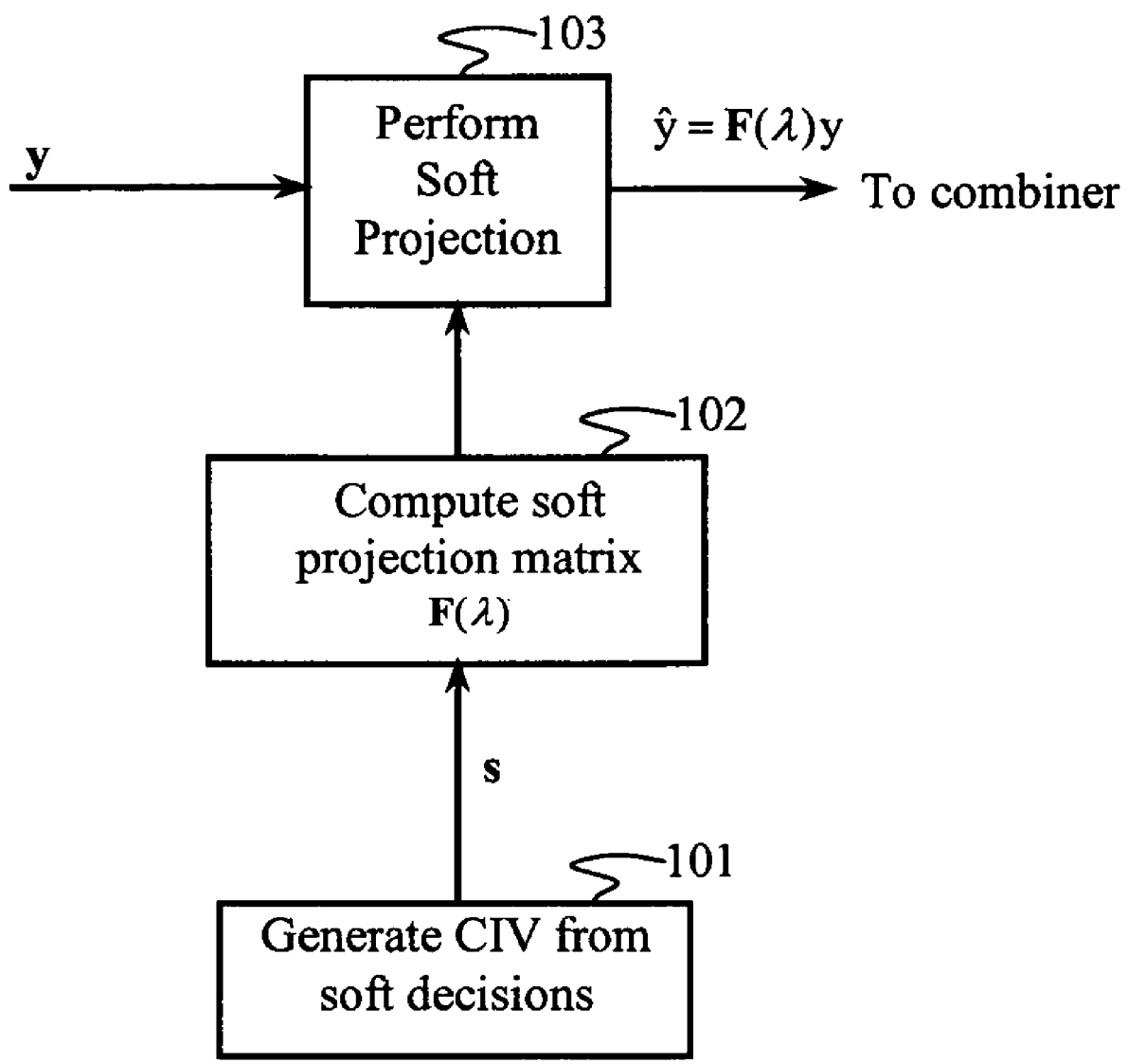
FIG. 1 is a flow diagram of an interference-cancelling method for a particular multipath component.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

A received baseband signal at a user handset having K base stations (or subchannels), U users, L propagation paths, and a sequence of transmitted symbols $\{b_k[m]\}$ can be expressed by $$y[n] = \sum_{k=1}^{K} \sum_{m=-\infty}^{\infty} \sum_{l=1}^{L} c_{k,l} s_k[n - Nm - d_{k,l}, b_k[m]] + v[n]$$

where $\{s_k[n, b_k[m]]\}$ is a discrete-time symbol-bearing waveform from base station k that has N samples per symbol period, the vector sequence $\{b_k[m]\}$ is a sequence of U user information symbols $b_k[m]=[b_{k,1}[m], \ldots, b_{k,U}[m]]$ from base station k, the values $c_{k,l}$ and $d_{k,l}$ are the complex channel fading coefficients and the time delays characterizing the propagation channel linking the $k^{th}$ base station to the receiver, and v[n] is additive noise having power $\sigma^2$. When a multi-code (e.g., CDMA, DSSS, WCDMA, DO) transmission is employed, a transmitted waveform can be represented as $$s_k[n, b_k[m]] + \sum_{u=1}^{U} b_{k,u}[m] w_{k,u}[n], \quad mN \le n < (m+1)N$$

where U is the number of users, $b_{k,u}[m]$ is a user data symbol (which is drawn from a finite constellation and is constant over symbol intervals of sample length N), and $w_{k,u}[n]$ is a user spreading code (including PN, covering, and filtering), which is typically time varying at the sample rate. The sampling rate corresponding to n is taken to be the normalized rate 1 and assumed to be greater than the chip rate. The received signal y[n] may be organized into a sequence of vectors at rate 1/N $$y[m] = \sum_{k}^{K} \sum_{m'} \sum_{l}^{L} c_{k,l} W_{k,l}[m - m'] b_k[m'] + v[m],$$

where $b_k$ contains symbols $b_{k,u}$ and the columns of the matrix $W_{k,l}$ comprise vectors of the form $$w_{k,l,u} = [w_{k,l,u}[mN - d_l], \ldots, w_{k,l,u}[(m+1)N - 1 - d_l]]^T.$$

Thus, the sampling rate corresponding to m remains 1/N.

The optimal receiver for a given user information sequence depends on the cellular network's operating mode (e.g., soft handoff, blocking). For example, if a particular handset is not in handoff and there is no inter-base-station interference (i.e., K=1), the optimal detection strategy for a single symbol of interest corresponding to a designated user is $$b_u[m] = \underset{b}{\operatorname{argmax}} \underset{\{b_{u'}[m']\}:b_u[m]=b}{\max} \operatorname{Re} \sum_l \bar{c}_l s_l^*[m; \{b[m']\}] \left( y[m] - \frac{1}{2} s[m; \{b[m']\}, l] \right),$$

where overbar denotes a complex conjugate and superscript * denotes a Hermitian transpose. The term $s_l[m; \{b[m']\}]$ is a received signal vector, delayed by $d_l$, corresponding to the vector-valued information sequence $\{b[m']\}$, and the vector $$s[m; \{b[m']\}, l] = \sum_{l' \ne l} c_{l'} s_{l'}[m; \{b[m']\}]$$

represents an interference signal formed from all of the paths not equal to path l. This exemplary embodiment impels approximations that cancel interference terms $s_l[m; \{b[m']\}]$ from received signals, in advance of Rake reception (i.e., the sum over l of $c_l s_l[m]$. The vector $s_l[m; \{b[m']\}]$ may be expressed as $$s_l[m; \{b[m']\}] = [s[mN - d_l, \{b[m']\}], \ldots, s[(m+1)N - 1 - d_l, \{b[m']\}]].$$

When the complex baseband signal y[m] is resolved at a particular ($l^{th}$) finger in a handset's Rake receiver, it can be simplified to a vector representation $$y = cx_u b_u + x_{MAI} + x_{INT} + v,$$

where y represents received data after it passes through a receiver pulse-shaping filter (e.g., a root raised-cosine pulse-shaping filter). The data y is time aligned to a particular path delay. The term c is a complex attenuation corresponding to the path.

When the modulation is linear, the term $x_u$ in path l, which represents a code waveform that typically includes an orthogonal basis code and an overlaid spreading sequence (e.g., a PN code) assigned to a user of interest, may be written as $$x_{1,l,u}[m] = c_{1,l} w_{1,l,u} b_{1,u}[m].$$

The term $w_{1,u}$, is the spread and scrambled code for user u in cell k=1, and $b_{1,u}$ is an information symbol corresponding to the user of interest. The term $x_{MAI}$ is multiple access interference, and it may be expressed by $$x_{1,l,MAI}[m] = c_l \sum_{u' \neq u} w_{1,l,u'} b_{1,u'}[m].$$

The term $x_{INT}$ may include inter-finger (and possibly inter-base-station) interference terms that are similar in form to $x_{MIA}$. The term v is a vector of complex additive noise terms. Each of the vectors $x_u$, $x_{MAI}$, and $x_{INT}$ is a signal resolved onto a Rake finger matched to the $l^{th}$ multipath delay of base station k at symbol period m.

A conventional Rake receiver resolves the measurement $x_u$ onto a user's code vector to form the statistic $x_u^* y_l$. Such statistics are typically derived from multiple Rake fingers and coherently combined across the paths via a maximum ratio combiner (i.e. they are weighted by the conjugate of the channel gains and summed). Alternatively, more general combining may be used.

FIG. 1 illustrates a signal processing method in accordance with an exemplary embodiment of the invention that is configured to reduce ISI in a received signal from a particular Rake finger. A CIV s is generated 101 by combining soft or hard estimates of interference corresponding t the other delays and/or base stations not tracked by the particular finger. For example, the soft estimates may correspond to interfering user subchannels from each base station tracked by a cellular handset. Soft or hard estimates may be derived from a conventional Rake receiver, an equalizer, or any detector matched to the communication protocol and channel conditions of a received signal. Embodiments of the invention may be configurable to operate within receivers employing receive diversity, equalization, transmit diversity combining, and/or space-time decoding.

Embodiments of the invention may include one or more CIVs. Therefore, in parts of the disclosure that describe a CIV, it is anticipated that a plurality of CIVs may be used. For example, specific embodiments may employ a matrix whose columns are CIVs. The CIV s is constructed from known and/or estimated active subchannels and then used to compute a soft projection matrix 102, $$F(\lambda) = I - \lambda ss^*.$$

The matrix $F(\lambda)$ is configured to operate on a received data vector y 103 to produce an interference-cancelled signal $\hat{y} = F(\lambda)y$, which is coupled to a Rake processor or combiner (not shown). The term I is an identity matrix, and the weight $\lambda$ may be determined symbol-by-symbol in order to maximize a post-processing SINR, $$\Gamma(\lambda) = \frac{|x_u^* F(\lambda) x_u|^2}{E|x_u^* F(\lambda) x_{MAI}|^2 + E|x_u^* F(\lambda) x_{INT}|^2 + \sigma^2 x_u^* F(\lambda) F^*(\lambda) x_u}.$$

In this expression, each vector of the form $x_u$ is $x_u[m]$, corresponding to symbol period m. Therefore, the post-processing SINR $\Gamma[\lambda]$ is measured symbol period-by-symbol period. The user powers are absorbed into the component vectors $x_u$, $x_{MAI}$, and $x_{INT}$. These powers are known or estimated.

At each symbol period, the SINR at a given finger can be expressed as $$\Gamma(\lambda) = \frac{a + b\lambda + c\lambda^2}{d + e\lambda + f\lambda^2}.$$

The coefficients are $$a = |x_u^* x_u|^2$$
$$b = -2 x_u^* x_u |x_u^* s|^2$$
$$c = |x_u^* s|^4$$
$$d = \sum_{u' \neq u} |x_u^* x_{u'}|^2 + |x_u^* s|^2 + \sigma^2 x_u^* x_u$$
$$e = -2\mathrm{Re}\left(\sum_{u' \neq u} (x_u^* x_{u'})(x_u^* s)(s^* x_{u'}) + |x_u^* s|^2 s^* s + \sigma^2 |x_u^* s|^2\right)$$
$$f = \sum_{u' \neq u} |x_u^* s|^2 |s^* x_{u'}|^2 + |x_u^* s|^2 |s^* s|^2 + \sigma^2 |x_u^* s|^2 (s^* s)$$

wherein each of the inner products may be computed from the user codes $w_k[m]$ and complex amplitudes $b_{l,u}[m]$ identified for user u at baud interval m. If orthogonal spreading codes are used, the expression $x_u^* x_{u'}$ with $u' \neq u$ is zero. Furthermore, the relevant inner product $x_{u'}^* s$ can be efficiently obtained for a CDMA/WCDMA system by passing the synthesized CIV s for the finger of interest through a fast Walsh transform (FWT). Computing the soft projection matrix 102 may include a step of maximizing the SINR $\Gamma(\lambda)$ by setting its derivative (with respect to $\lambda$) to zero (not shown), resulting in the following polynomial equation $$(ce-bf)\lambda^2 + 2(cd-af)\lambda + (bd-ae) = 0.$$

One of the roots of the polynomial equation corresponding to the maximum SINR is selected (not shown) and then used to scale ss* in the matrix $F(\lambda)$. Once computed, $F(\lambda)y$ may be scaled to conform to downstream processing in a baseband receiver.

It should be appreciated that variations to the previously described process for determining the weight $\lambda$ may be made without departing from the spirit and scope of the claimed invention. For example, when a cellular handset is in a soft-handoff mode, there is an additional quadratic term in the numerator of $\Gamma(\lambda)$ corresponding to the received signal power from the second base station, and there is one less term in the denominator. This changes the function $\Gamma(\lambda)$, but it does not change the procedure for determining the value of $\lambda$ that maximizes $\Gamma(\lambda)$. Furthermore, algorithms for maximizing $\Gamma(\lambda)$ may be incorporated into other receiver processing techniques, such as (but not limited to) Rake path tracking, active user determination, amplitude estimation, receive diversity, and equalizing. $\Gamma(\lambda)$ may be approximately maximized with variations or stochastic gradients.

Figure 2A:
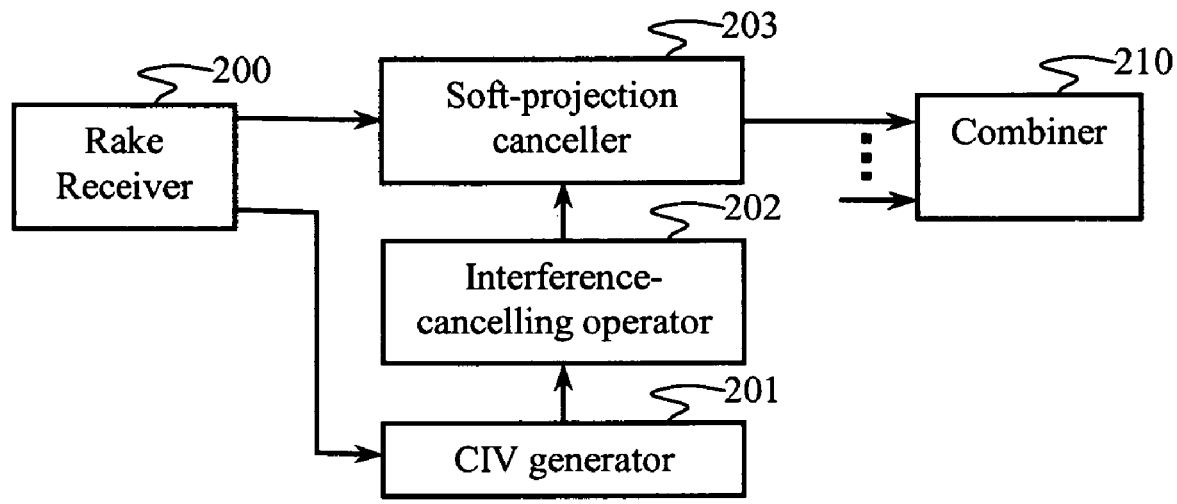
FIG. 2A is a schematic block diagram of a circuit configured for cancelling interference and combining interference-cancelled multipath components.

FIG. 2A is a schematic block diagram of a circuit in accordance with an alternative embodiment of the invention that includes a CIV generator 201, an interference-cancelling operator 202, and a soft-projection canceller 203. Inputs to the CIV generator 201 and the soft-projection canceller 203 are coupled to outputs of a Rake receiver 200. An output of the soft-projection canceller 203 is coupled to the input of a combiner 210.

Figure 2B:
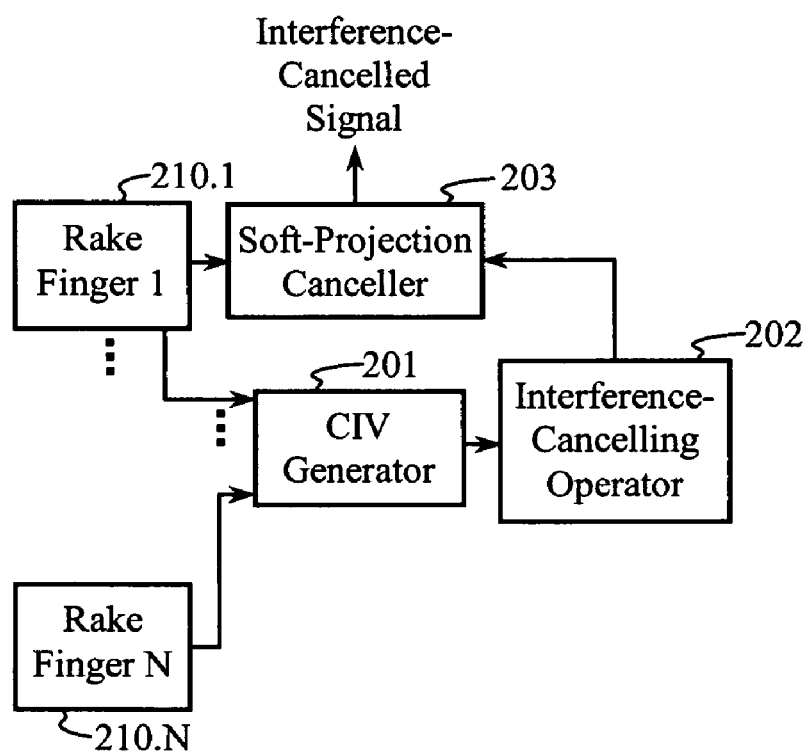
FIG. 2B is a schematic block diagram of a circuit configured for cancelling interference from at least one finger of a Rake receiver that produces a CIV from signals received by all fingers of the Rake receiver.

The soft-projection canceller 203 is configured to cancel interference from at least one path (or finger) of the Rake receiver 200. Soft and/or hard estimates from at least one other path or finger are processed by the CIV generator 201 to produce a CIV s. For example, FIG. 2B shows signals from rake fingers 210.1-210.N being used to construct a CIV in order to cancel interference from one of the rake fingers (e.g., 210.1). The interference-cancelling operator 202 uses the CIV s and user code x, to compute a soft-projection matrix. The soft-projection matrix computes the weight value $\lambda$ that maximizes the SINR of the interference-cancelled signal $\hat{y}=F(\lambda)y$. The interference-cancelled signal $\hat{y}$ output from the soft-projection canceller 203 may be coupled into the combiner 210 and combined with interference-cancelled signals from other paths or Rake fingers.

The functions of the various elements shown in the drawings, including functional blocks, may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include currently known equivalents as well as equivalents developed in the future, i.e., any elements developed that perform the same function, regardless of structure.

The invention claimed is:

1. An apparatus configured to remove interference from a received baseband signal in a CDMA system, comprising:
    a composite interference vector (CIV) generator configured to produce at least one CIV by combing estimates of interference;
    an interference-cancelling operator configured for generating a soft-projection operator,
    a soft-projection canceller configured for performing a soft projection operator, and
    a Rake receiver.

2. The apparatus recited in claim 1, wherein each finger of the Rake receiver is matched to at least one of a time delay and a base station spreading code.

3. The apparatus recited in claim 1, wherein the apparatus is configured to cancel interference in a first Rake finger and the CIV generator configured to generate the at least one CIV from at least one Rake finger that does not include the first Rake finger.

4. The apparatus recited in claim 1, wherein the CIV generator is configured to derive the estimates from at least one of a Rake receiver, an equalizer, a receiver employing receive diversity, a receiver employing transmit diversity combining, and a receiver employing space-time decoding.

5. The apparatus recited in claim 1, wherein the interference-cancelled signal output from the soft-projection canceller is coupled to at least one of a combiner and a Rake receiver.

6. The apparatus recited in claim 5, wherein the at least one of the combiner and the Rake receiver is configured to combine a plurality of interference-cancelled signals.

7. A method for cancelling interference from a received baseband signal in a CDMA system, comprising:
    providing for generating at last one composite interference vector (CIV) by combining estimates from interfering subchannels,
    providing for generating a soft-projection operator,
    providing for performing a soft projection of the received baseband signal to output an interference-cancelled signal and
    wherein the estimates are derived from a Rake receiver.

8. The method recited in claim 7, wherein each finger of the Rake receiver is matched to at least one of a time delay and a base station spreading code.

9. The method recited in claim 7, wherein the received baseband signal is coupled from a first Rake finger and providing for generating the at least one CIV is configured to generate the at least one CIV from at least one Rake finger that does not include the first Rake finger.

10. The method recited in claim 7, wherein providing for generating the at least one CIV is configured to derive the estimates from at least one of a Rake receiver, an equalizer, a receiver employing receive diversity, a receiver employing transmit diversity combining, a receiver employing space-time decoding.

11. The method recited in claim 7, wherein providing for performing the soft projection further comprises coupling the interference-cancelled signal to at least one of a combiner and a Rake receiver.

12. The method recited in claim 11, wherein providing for performing the soft projection is followed by providing for combining a plurality of interference-cancelled signals.

13. A chipset configured to perform the receiving method recited in claim 7.

14. A digital computer system programmed to perform the method recited in claim 7.

15. A computer-readable medium storing a computer program implementing the method of claim 7.

16. A base station configured to perform the method of claim 7.

17. A handset configured to perform the method of claim 7.

18. An interference-cancellation system configured for removing interference from a received baseband signal in a CDMA system, comprising:
    a means for generating at least one composite interference vector (CIV) by combining estimates of interference,
    a means for generating a soft-projection operator, a means for performing a soft projection of the received baseband signal to output an interference-cancelled signal, and a means for generating the at least one CIV is configured to obtain the estimates from a Rake receiver.

19. The system recited in claim 18, wherein each finger of the Rake receiver is matched to at least one of a time delay and a base station spreading code.

20. The system recited in claim 18, wherein the means for performing a soft projection is configured to couple the received baseband signal from a first Rake finger, and the means for generating the at least one CIV is configured to generate the at least one CIV from at least one Rake finger that does not include the first Rake finger.

21. The system recited in claim 18, wherein the means for generating the at least one CIV is configured to derive the estimates from at least one of a Rake receiver, an equalizer, a receiver employing receive diversity, a receiver employing transit diversity combining, and a receiver employing space-time decoding.

22. The system recited in claim 18, wherein the means for performing the soft projection further comprises a means for coupling the interference-cancelled signal to at least one of a combiner and a Rake receiver.

23. The system recited in claim 22 wherein the means for performing the soft projection further comprises a means for combining a plurality of interference-cancelled signals for receive diversity.

24. An apparatus configured to remove interference from a received baseband signal in a DCMA system, comprising:

a composite interference vector (CIV) generator configured to produce at least one CIV by combing estimates of interference;

an interference-cancelling operator configured for generating a soft-projection operator, a soft-projection canceller configured for performing a soft projection operator, a Rake receiver, and an interference-cancelling operator configured to generate a soft-projection matrix to operate on a received data vector, the soft-projection matrix having the form $F(\lambda)=I-\lambda ss^*$, where I is an identity matrix, $\lambda$ is a weight, and s is a CIV.

25. The apparatus recited in claim 24, wherein the interference-cancelling operator is configured for determining the weight $\lambda$ by maximizing a post-processing SINR.

26. The apparatus recited in claim 25, wherein the interference-cancelling operator is configured for determining the weight $\lambda$ by maximizing a post-processing SINR for a handset operating in a soft-handoff mode.

27. A method for cancelling interference from a received baseband signal in a CDMA system, comprising:

providing for generating at last one composite interference vector (CIV) by combining estimates from interfering subchannels, providing for generating a soft-projection operator, providing for performing a soft projection of the received baseband signal to output an interference-cancelled signal, and wherein the estimates are derived from a Rake receiver, and wherein providing for generating the soft-projection operator is configured to generate a soft-projection matrix to operate on a received data vector, the soft-projection matrix having the form $F(\lambda)=I-\lambda ss^*$, where I is an identity matrix, $\lambda$ is a weight, and s is a CIV.

28. The method recited in claim 27, wherein providing for generating the soft-projection operator is configured for determining the weight $\lambda$ by maximizing a post-processing SINR.

29. The method recited in claim 28, wherein providing for generating the soft-projection operator is configured for determining the weight $\lambda$ by maximizing a post-processing SINR for a handset operating in a soft-handoff mode.

30. An interference-cancellation system configured for removing interference from a received baseband signal in a CDMA system, comprising:

a means for generating at least one composite interference vector (CIV) by combining estimates of interference, a means for generating a soft-projection operator, a means for performing a soft projection of the received baseband signal to output an interference-cancelled signal, and a means for generating the at least one CIV is configured to obtain the estimates from a Rake receiver, and a means for generating the soft-projection operator is configured to generate a soft-projection matrix to operate on a received data vector, the soft-projection matrix having the form $F(\lambda)=I-\lambda ss^*$, where I is an identity matrix, $\lambda$ is a weight, and s is a CIV.

31. The system recited in claim 30, wherein the means for generating the soft projection operator is configured for determining the weight $\lambda$ by maximizing a post-processing SINR.

32. The system recited in claim 31, wherein the means for generating the soft-projection operator is configured for determining the weight $\lambda$ by maximizing a post-processing SINR for a handset operating in a soft-handoff mode.

* * * * *